July 29, 1969  C. SMITHYMAN  3,458,010
LUBRICATORS

Filed Dec. 21, 1967  2 Sheets-Sheet 1

INVENTOR
Charles Smithyman

United States Patent Office 3,458,010
Patented July 29, 1969

3,458,010
LUBRICATORS
Charles Smithyman, Alliance, Ohio, assignor to
Richard O. Poto, Alliance, Ohio
Filed Dec. 21, 1967, Ser. No. 692,593
Int. Cl. F16n 29/04
U.S. Cl. 184—6                                    6 Claims

ABSTRACT OF THE DISCLOSURE

A shaft and lubricator for a plurality of side by side bearings on said shaft is provided including an axial bore in the shaft, a plurality of spaced apart radial holes in the shaft from the bore, one to each bearing, a cylindrical manifold rotatable in the bore and provided with a central passage and radial holes corresponding to the holes in the shaft, said holes in the shaft and manifold being spirally spaced relatively to one another so that only one set of holes is in alignment at any given time, an index cap on the manifold and a pressure lubricator means in the cap communicating with the interior of the manifold.

---

This invention relates to lubricators and particularly to a manifold lubricator capable of independently lubricating each of a series of bearings on a common shaft or pin.

There are many mechanical systems in which a plurality of different bearings are mounted on a single common shaft. A typical arrangement of this sort is found on hoisting and conveying machinery such as cranes. In such equipment it is common to mount a series of side-by-side sheaves on a common shaft or pin to carry a multiplicity of parallel lines. The lubrication of each of these bearings poses a very real and intricate problem. A common practice in the art is to lubricate each bearing through a single hole drilled in the shaft or pin from the exposed end. This requires a separate fitting and line for each bearing and a complex arrangement of grease fittings for attachment of lubricating equipment. This is is a very complex and expensive arrangement and creates real problems in drilling and setting the fitting lines and shaft.

I have invented a lubricating manifold arrangement which eliminates these problems of the prior art and greatly simplifies the operation of lubricating a plurality of bearings on a single shaft. My invention also simplifies the construction of shafts for multiple bearings and drastically reduces the cost of such shafts.

In a preferred embodiment of shaft and lubricator for mounting a multiplicity of bearings, I provide a shaft carrying a plurality of bearings, an axial passage in said shaft, a radial hole from said passage through the shaft at each bearing, a cylindrical manifold rotatably mounted in said passage in sealing relationship, a plurality of spirally arranged holes in said manifold spaced axially therealong corresponding to the holes in the shaft whereby on rotation of the manifold a single hole of the manifold aligns with the corresponding hole in the shaft in communication therewith, a pressure lubrication fitting communicating with the interior of said manifold, index means on said manifold and on the end of said shaft indicating the position of each hole in the manifold relative to the holes in the shaft and means for rotating said manifold relative to the shaft.

In the foregoing general description of my invention, I have set out certain objects, purposes and advantages of my invention. Other objects, purposes and advantages will be apparent from a consideration of the following description and the accompanying drawings in which.

Figure 1:
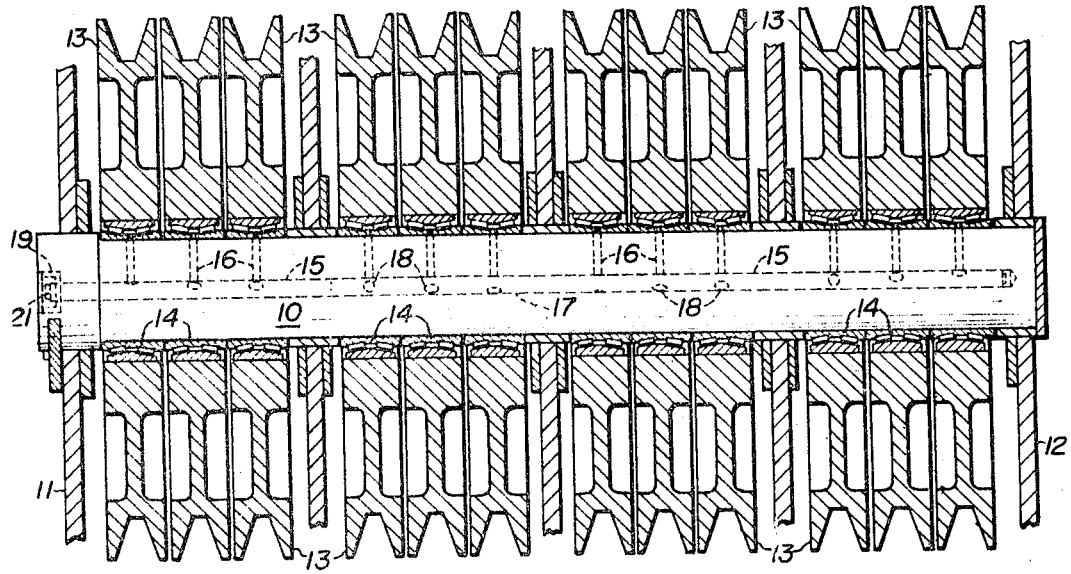
FIGURE 1 is an elevational view, partly in section, of a series of side-by-side sheaves on a shaft embodying the lubricator of my invention.
Figure 2:
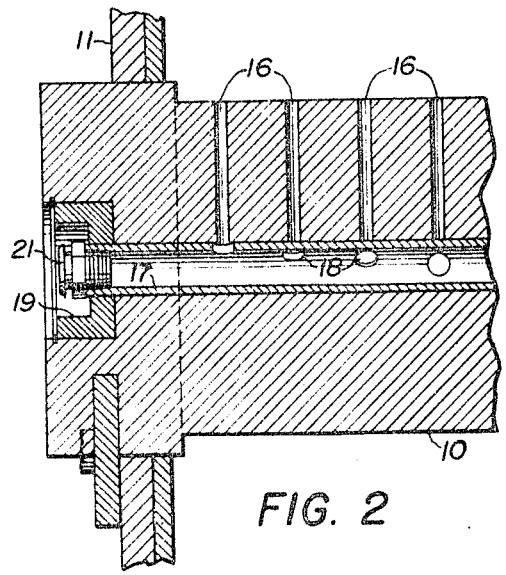
FIGURE 2 is an enlarged segmental section of the feed end of the shaft of FIGURE 1.
Figure 3:
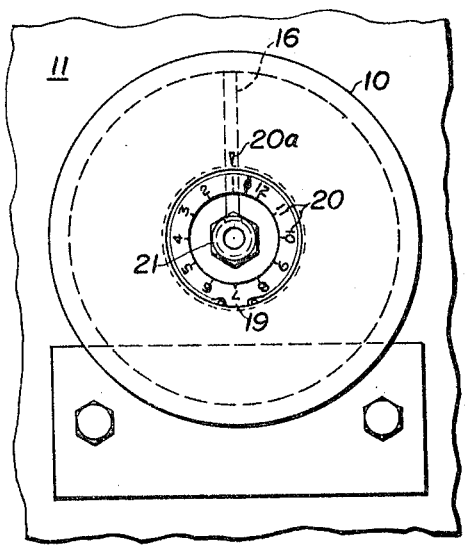
FIGURE 3 is an elevational view of the end of the shaft of FIGURE 1.
Figure 4:
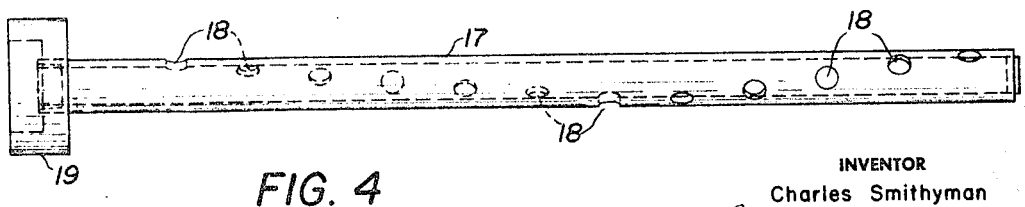
FIGURE 4 is an elevational view of the lubricator cylinder of FIGURE 1.

Referring to the drawings, I have illustrated a shaft 10 mounted at each end in frame members 11 and 12 and carrying side-by-side sheaves 13 on bearings 14. The shaft 10 is provided with an axial passage or bore 15 open at one end. A plurality of radial holes 16 are provided, one from bore 15 to each bearing 14. A cylindrical lubricator 17 is rotatably mounted in the bore 15 and is provided with radial holes 18 spaced apart an axial distance equal to the axial distance between holes 16 in shaft 10 and spaced spirally around the cylinder. The cylinder 17 is fitted with a cap 19 having index markings 20 cooperating with an index mark 20a to indicate the relative positions of holes 16 and 18. A pressure grease fitting 21 is placed in the cap 19 through which grease is injected into the interior of cylinder 17.

The operation of the lubricator is as follows. Cap 19 is rotated to align the first hole 18 of cylinder 17 with the first hole 16 of shaft 10 and grease is injected through fitting 21 into the interior of cylinder 17, through first holes 18 and 16 into the first bearing of the sheaves. The cap is then rotated to align the second hole of the cylinder with the second hole of the shaft and grease is fed to the second bearing. This is repeated until each bearing is lubricated. The cap is then rotated to closed or park position with all holes out of alignment.

Figure 5:
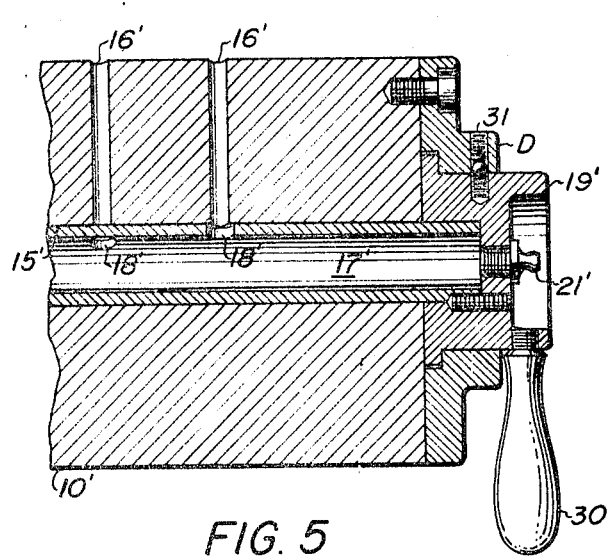
FIGURE 5 is an enlarged segmental section of a second embodiment of feed end of the shaft and lubricator of my invention.
Figure 6:
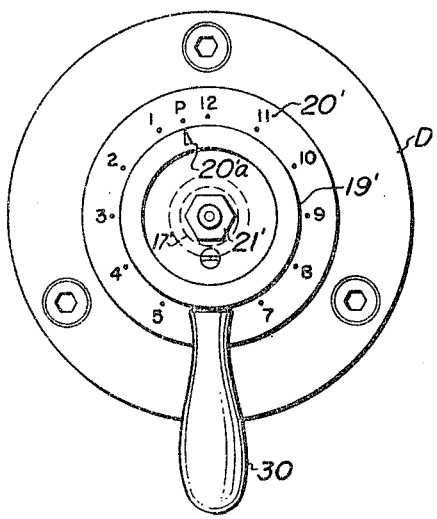
FIGURE 6 is an end elevation of the shaft of FIGURE 5.

In FIGURES 5 and 6, I have illustrated a second embodiment of my invention in which the parts are generally identical in function and bear like numerals with the prime sign. In this embodiment, I provide a handle 30 mounted in cap 20' to make rotation easier and a ball spring detent 31 in part D attached to shaft 10' which engages a cup point screw at each index point, to hold the cap against rotation when the lubricator is stopped at each index point for lubrication as well as at the park position.

While I have illustrated and described certain preferred embodiments of my invention in the foregoing specification, it will be understood that this invention may be otherwise embodied within the scope of the following claims.

I claim:
1. A shaft and lubricator structure comprising a shaft adapted to receive a plurality of side-by-side bearings, said shaft having an axial bore therein and a plurality of spaced apart radial holes, one from said bore to each bearing, a cylindrical manifold rotatably mounted in said bore and provided with a central passage, said manifold having a plurality of radially spaced holes corresponding to the holes of said shaft, said holes of said shaft and said manifold being spirally placed relative to one another, a cap on the manifold fixed thereto for rotation therewith, cooperating index means on said shaft and cap, and pressure lubricator means in said cap communicating with the interior of the manifold.

2. A shaft and lubricator structure as claimed in claim 1 wherein the radial holes in said shaft are spaced apart along a single plane parallel to and intersecting its axis and the holes in the manifold are spaced apart on a helix such that only one hole in the manifold is in line with a hole in the shaft at any given index position.

3. A shaft and lubricator structure as claimed in claim 1 wherein the radial holes in said shaft are spaced apart along a spiral surrounding the axis and the holes in the manifold are spaced apart along a straight line parallel to its axis such that only one hole in the manifold is in alignment with one hole in the shaft at any given index position.

4. A lubrication manifold structure comprising an outer housing having a central elongated cylindrical bore, a plurality of spaced apart passages extending radially from said bore to the exterior of said housing, each said passage being adapted to be in communication with a bearing surface to be lubricated, a cylindrical manifold rotatably mounted in said bore and provided with a central passage closed at each end, said manifold having a plurality of radially spaced holes corresponding to the passages in said housing, said holes and passages being spirally placed relative to one another, a cap on one end of said manifold for rotation therewith, cooperating index means on said housing and cap and pressure lubricator means in said cap communicating with the interior of said manifold.

5. A lubricator manifold as claimed in claim 4 wherein the radial passages in said shaft are spaced apart along a single plane through its axis and the holes in the manifold are spaced apart on a helix such that only one hole in the manifold is in alignment with a passage in the housing at any given index position.

6. A lubrication manifold as claimed in claim 4 wherein means are provided from each passage to a bearing surface to be lubricated.

References Cited

UNITED STATES PATENTS

| | | | |
|---|---|---|---|
| 1,285,393 | 11/1918 | Robertson | 184—1 |
| 1,573,293 | 2/1926 | Black | 308—103 |
| 2,999,000 | 9/1961 | Spat. | |
| 3,038,556 | 5/1962 | Hamm et al. | |

HALL C. COE, Primary Examiner

U.S. Cl. X.R.

308—78, 95